United States Patent
Hwa et al.

(10) Patent No.: US 6,934,286 B2
(45) Date of Patent: Aug. 23, 2005

(54) VIRTUAL LOCAL AREA NETWORK SYSTEM CAPABLE OF SENDING TAG FRAMES

(75) Inventors: Tan Joo Hwa, Tokyo (JP); Katsuhiko Miyamoto, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 860 days.

(21) Appl. No.: 09/820,890

(22) Filed: Mar. 30, 2001

(65) Prior Publication Data

US 2002/0003801 A1 Jan. 10, 2002

(30) Foreign Application Priority Data

Jul. 7, 2000 (JP) .................................... 2000-206915

(51) Int. Cl.$^7$ ............................................. H04L 12/28
(52) U.S. Cl. ............................................. 370/389; 370/401
(58) Field of Search ................................. 370/352, 389, 370/392, 395.53, 401

(56) References Cited

U.S. PATENT DOCUMENTS

| | | | |
|---|---|---|---|
| 5,684,800 A | * | 11/1997 | Dobbins et al. ............. 370/401 |
| 6,181,699 B1 | * | 1/2001 | Crinion et al. ............... 370/392 |
| 6,775,290 B1 | * | 8/2004 | Merchant et al. ......... 370/395.53 |

FOREIGN PATENT DOCUMENTS

JP           11-074923           3/1999

* cited by examiner

*Primary Examiner*—Chau Nguyen
*Assistant Examiner*—Andrew Wahba
(74) *Attorney, Agent, or Firm*—Venable LLP; Catherine M. Voorhees

(57) ABSTRACT

A TAG-VLAN system capable of sending tag frames according to the present invention has a switch for sending a packet including VLAN IDs managed by the switch and a terminal for storing the VLAN IDs of the packet sent by the switch, distinguishing when the VLAN ID is the VLAN ID that the terminal itself belongs to and performing setting relating to its own VLAN.

16 Claims, 2 Drawing Sheets

VIRTUAL LOCAL AREA NETWORK SYSTEM CAPABLE OF SENDING TAG FRAMES

CROSS-REFERENCE TO RELATED APPLICATION

This application claims the priority of Japanese application Serial No. 206915/2000 filed Jul. 7, 2000, the subject matter of which is incoporated herein by refernce.

BACKGROUND OF THE INVENTION

1. Field of the Invention

The present invention relates to a system for identifying Virtual Local Area Network (VLAN) ID's of terminals in a VLAN, and more specifically relates to a method of automatically identifying and setting a VLAN ID for a terminal, rather than having a user set a VLAN ID by hand.

2. Description of the Related Art

Related switching hubs for sending and receiving frames disclosing VLAN information are disclosed in Japanese Patent Laid-open Publication (kokai) No. Heisei 11-074923. The following system is well known as a system for creating a VLAN. A user sets a VLAN to which a terminal belongs by hand. The terminal sends this VLAN information together with a GVRP (a GARP VLAN Registration Protocol conforming to IEEE802.1Q, where GARP is an abbreviation for Generic Attribute Registration Protocol) packet message over a Local Area Network (LAN) to a LAN switch (hereinafter abbreviated to LSW) for relaying frames. When the LSW receives this GVRP packet message, this VLAN information is registered at the LSW. The above is one system for creating a VLAN.

When creating VLANs capable of processing tag frames conforming to IEEE802.1Q (hereinafter referred to as TAG-VLANs), the addition and withdrawal of terminals to and from the TAG-VLAN is performed by a user manually setting a VLAN ID for each terminal using existing functions of the terminal.

Even if this related system is employed, communication can then be commenced by setting existing TAG-VLAN ID's for each terminal and then transmitting and receiving packets. This means that work such as confirming the TAG-VLAN ID conditions from a network manager in advance has to be carried out offline. When a new TAG-VLAN is created, it is still necessary to set TAG-VLAN ID's manually from the terminals. This is a laborious procedure where the same setting operation has to be repeated N times when N terminals are to be set.

SUMMARY OF THE INVENTION

According to one aspect of the present invention, for achieving the above object, there is provided, as a specific configuration, a TAG-VLAN system capable of sending tag frames comprising a switch for sending a packet including VLAN IDs managed by the switch and a terminal for storing the VLAN IDs of the packet sent by the switch, distinguishing when the VLAN ID is the VLAN ID that the terminal itself belongs to and performing setting relating to its own VLAN.

The present application discloses other various inventions made to achieve the above-described object. These inventions will be understood from the appended claims, the following embodiments and the accompanying drawings.

BRIEF DESCRIPTIONS OF THE DRAWING

The objects and features of the invention may be understood with reference to the following detailed description of an illustrative embodiment of the invention, taken together with the accompanying drawings in which.

DETAILED DESCRIPTIONS OF THE PREFERRED EMBODIMENTS

First Embodiment

Figures 1, 2:
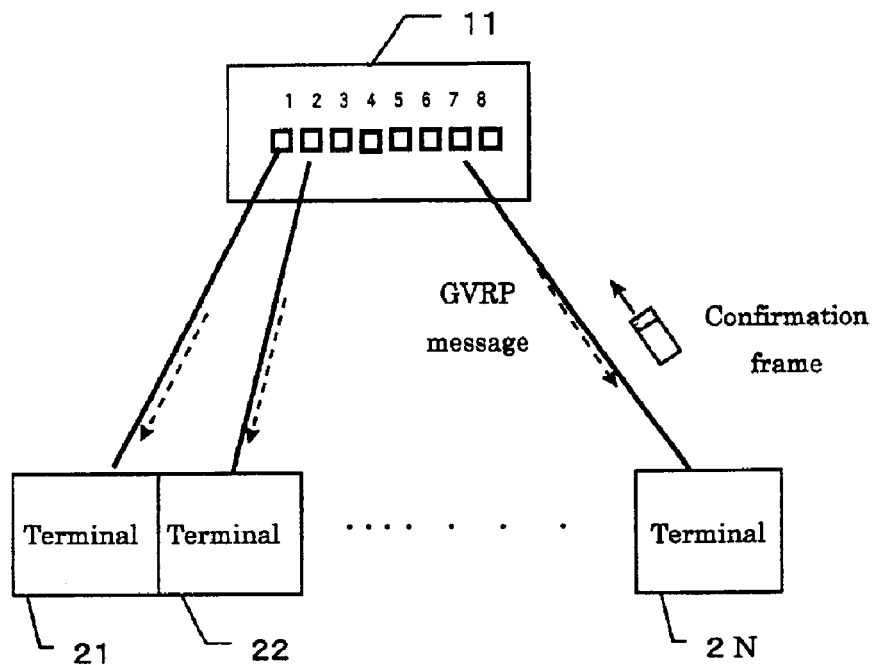
FIG. 1 is a configuration view showing a first specific example of an automatic TAG-VLAN ID identification system of the present invention.
FIG. 2 is a view showing the GVRP packet message format.

FIG. 1 is a configuration view showing a first specific example of an automatic TAG-VLAN ID identification system of the present invention. This first specific example comprises an LSW 11, and N terminals 21, 22 . . . 2N (where N is a natural number excluding zero) connected to the LSW 11.

The LSW 11 is at least a TAG-VLAN for one group, and its preset IP address. A VLAN can be set for each port of the LSW 11. Each port of the LSW 11 can be set to belong to both a TAG-VLAN and a VLAN that is not capable of processing tag frames (hereinafter referred to as an UNTAG-VLAN).

The LSW 11 periodically sends GVRP packet messages to the all of the terminals 21 to 2N connected to the LSW 11. FIG. 2 is a view showing the GVRP packet message format. A GVRP packet message is a control message including all of the VLAN ID information for managing the LSW 11. However, information as to whether this VLAN ID is for a TAG-VLAN or an UNTAG-VLAN is not included in the GVRP packet message.

Terminals connected to the LSW 11 may include computers, HUBs telephones capable of packet transmission, and other LSW's etc. The terminal 21 is a computer capable of transmitting tag frames and has a function for monitoring GVRP packet messages sent by the LSW 11.

The terminal 21 is set with it's own Gateway Address (hereinafter referred to as GW address) and Internet Protocol Address (hereinafter referred to as IP address) but is not yet set with a TAG-VLAN ID. The terminal 21 monitors GVRP packet messages sent by the LSW 11 and stores the ID's of all of the VLANs managed by the LSW 11 included in the GVRP packet message.

Figure 3:
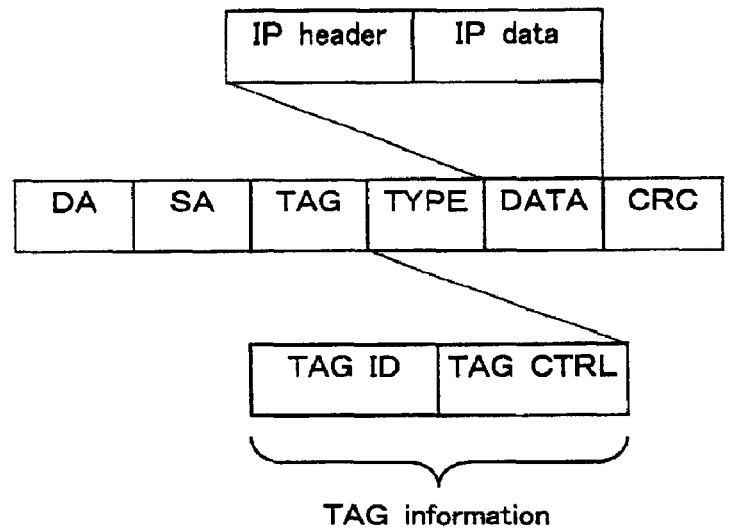
FIG. 3 is a view showing the confirmation frame format.

An example of a confirmation frame is shown in FIG. 3. The confirmation frame is a tag frame, with a destination address in the DA field, a source address in the SA field, ID and control information for a TAG-VLAN in the TAG field, a frame type in the TYPE field, an IP header and IP data in the DATA field, and information for error checking in the CRC field. The terminal 21 sends a confirmation frame to the LSW 11, describing a GW address as a destination address and a self IP address as a source address in an IP header of a DATA field, and describing one of the stored VLAN IDs in the TAG ID of the TAG field.

The terminal 21 produces and sends a confirmation frame for each one VLAN ID. In this case, the terminal 21 sets and waits for a timeout for a reply with respect to the confirmation frame from the LSW 11. If the LSW 11 does not reply to the confirmation frame within the period of the time-out, the terminal 21 determines whether or not the VLAN ID and GW address described in the transmitted confirmation frame match, i.e. determines whether the VLAN ID is erroneous. The terminal 21 then selects a VLAN ID which is not yet being used from the VLAN IDs read from the GVRP packet message. The terminal 21 then describes the selected VLAN ID in the confirmation frame and sends the confirmation frame to the LSW 11. The terminal 21 repeats the operation of sending this confirmation frame until a reply to the confirmation frame comes from the LSW 11.

When the LSW 11 receives the confirmation frame, the LSW 11 confirms the VLAN ID and GW address of the destination address described in the confirmation frame. Normally, the GW address is set to be the same as the IP address of the VLAN ID that it is intended to attribute to the terminal 21. The LSW 11 stores a pair consisting of the VLAN ID for managing itself and it's associated IP address. The LSW 11 then verifies whether or not the pair of the VLAN ID and IP address and the pair of the VLAN ID and IP address described in the confirmation frame sent by the terminal 21 match.

When the pair of the VLAN ID and the IP address managed by the LSW 11 and the pair of the VLAN ID and the GW address described in the confirmation frame sent by the terminal 21 do not match, the LSW 11 discards the confirmation frame.

When the pair of the VLAN ID and the IP address managed by the LSW 11 and the pair of the VLAN ID and the GW address described in the confirmation frame sent by the terminal 21 match, the LSW 11 reads in the TAG field information for the confirmation frame and determines whether or not processing can be implemented using this VLAN ID.

When the LSW 11 determines that processing is possible using this VLAN ID, a reply is sent to the terminal 21. When the terminal 21 receives a reply from the LSW 11, by setting the VLAN ID automatically, communication can be carried out thereafter by using this VLAN ID.

The terminal 21 makes the same number of confirmation frames as there are stored VLAN IDs and sends these confirmation frames collectively to the LSW 11. At this time, the terminal 21 can discern for which VLAN ID a response is intended by appending the VLAN ID of the confirmation frame sent by the terminal 21 to the response frame from the LSW 11. Confirmation of useable VLAN IDs can therefore be performed rapidly by sending confirmation frames describing each VLAN ID without waiting for a timeout.

In this specific example, the LSW 11 manages a plurality of VLAN ID's but it is also possible for there to be just one VLAN ID. In this case, the ID of the VLAN to which the terminal 21 belongs can be confirmed without the terminal 21 sending a confirmation frame.

As described in detail above, setting of VLAN IDs is performed at the LSW 11 and VLAN IDs managed by the LSW 11 can be acquired at the terminals from the GVRP packet messages sent by the LSW 11. By then sending a confirmation frame, VLAN IDs to which the terminal 21 may belong can be identified. The VLAN IDs can therefore be set in an on-line operation without the user having to check VLAN IDs and the setting operations can therefore be carried out regardless of conditions such as whether or not a network manager is present.

Further, VLAN IDs can be set collectively at the LSW 11 without having to be set individually by hand at each terminal which reduces the amount of work that has to be performed, particularly in the case of setting a plurality of terminals. Further, the time and trouble involved in the setting operation is also reduced in cases where a terminal is moved.

Second Embodiment

Figure 4:
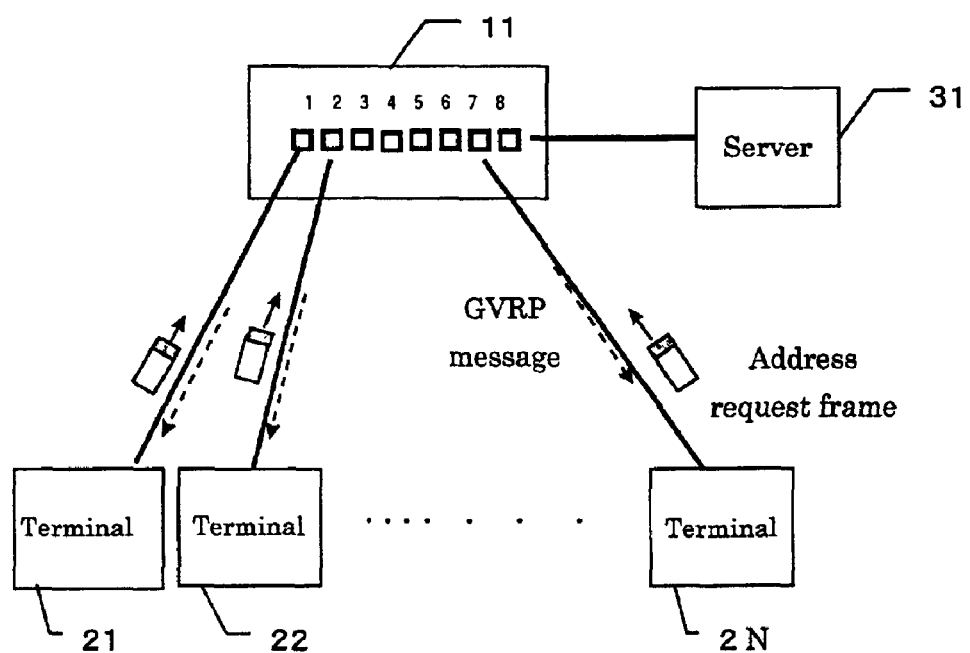
FIG. 4 is a configuration view showing a second specific example of an automatic VLAN ID identification system of the present invention.

FIG. 4 is a configuration view showing a second specific example of an automatic VLAN ID identification system of the present invention. In addition to the same configuration as the first specific example, the second specific example also comprises an address resolving server 31.

The second specific example operates in the same manner as the first specific example, and a description of the operation is therefore omitted. In the second specific example, the VLAN IDs 2, 3, and 5 are present in the LSW 11 as a whole, and the VLAN of ID 3 is set to be a TAG-VLAN. The address resolving server 31 is connected to the TAG-VLAN and the set port. Further, the number of terminals that can be connected to the LSW 11 and the same number of IP addresses are stored at the address resolving server 31.

Moreover, in the second specific example, in addition to the VLAN ID, there is as yet no GW address and IP address set for the terminal 21 itself.

The terminal 21 monitors GVRP packet messages sent by the LSW 11 and stores the ID's of all of the VLANs included in the GVRP packet message. The terminal 21 makes an address request frame constituted by a tag frame describing one of the stored VLAN IDs, and sends the address request frame to the address resolving server 31.

When the VLAN ID described in the address request frame sent from the terminal 21 is 2 or 5, when the LSW 11 determines that this VLAN ID does not coincide with the VLAN ID to which the address resolving server 31 belongs, the address request frame is discarded without being sent to the address resolving server 31. When a response is not received within the timeout set, the terminal 21 determines that the VLAN ID described in the transmitted address request frame does not belong to the address resolving server 31. The terminal 21 then selects a VLAN ID which is not being used from the VLAN IDs read from the GVRP packet message. The terminal 21 then describes the selected VLAN ID in the address request frame and sends the address request frame to the address resolving server 31. The terminal 21 repeats the operation of sending this address request frame until a response comes from the address resolving server 31.

On the other hand, when the VLAN ID described in the address request frame sent from the terminal 21 is 3, when the LSW 11 determines that this VLAN ID matches with the VLAN ID to which the address resolving server 31 belongs, the address request frame undergoes switching and is sent to the address resolving server 31.

Upon receiving an address request frame, the address resolving server 31 selects an arbitrary IP address from the pre-stored IP addresses and sends this IP address back to the terminal 21 constituting the source of this address request frame. The address resolving server 31 then sets the IP address that is sent back to being used so that the IP address cannot be used again upon a further request for an address from another terminal.

Upon receiving an address request frame response from the address resolving server 31, the terminal 21 reads in and then automatically sets the IP address. The terminal 21 can then carry out normal communication using the IP address setting. Further, the terminal 21 acknowledges the VLAN ID in the response from the address resolving server 31 as the ID of the VLAN to which it itself belongs, and carries out setting automatically.

In this example, address request frames are made one at a time and transmitted but it is also possible for the terminal 21 to make the same number of address request frames described in each stored VLAN ID as there are VLAN IDs, and to send the address request frames to the address resolving server 31 without waiting for the timeout. At this time, the response from the address resolving server 31 is sent affixed to the VLAN ID of the address request frame sent by the terminal 21. As a result, the terminal 21 can determine which VLAN ID a response has been given for and whether or not this VLAN ID is an ID for the VLAN to which it itself belongs.

In the second specified example, an IP address is received from the address resolving server 31 but the present invention is by no means limited in this respect, and can also enable the receiving of an automatic setting for three layer addresses etc. occurring in OSI reference models for other systems such as I P X (Internetwork Packet eXchange) and AppleTalk systems.

As described in detail above, setting of VLAN IDs is performed at the LSW 11 and VLAN IDs managed by the LSW 11 can be acquired at the terminal 21 from the GVRP packet messages sent by the LSW 11. By then sending an address request frame, VLAN IDs to which the terminal 21 may belong can be identified. The VLAN IDs can therefore be set in an on-line operation without the user having to check VLAN IDs and the setting operations can therefore be carried out regardless of conditions such as whether or not a network manager is present.

VLAN IDs can then be set collectively at the LSW 11 without having to be set individually by hand at each terminal which reduces the amount of work that has to be performed in the case of setting a plurality of terminals. In addition, it is possible to receive the IP address and automatically carry out setting by preparing the IP address at the address resolving server 31 in advance.

What is claimed is:

1. A method of determining whether a VLAN ID may be assigned to a terminal, said method comprising the steps of:
    a switch sending a GVRP packet message including VLAN IDs that the switch itself manages;
    a terminal storing VLAN IDs managed by the switch by monitoring GVRP packet messages sent by the switch, and describing the VLAN IDs and its own Gateway Address in confirmation frames constituted by tag frames for sending to the switch;
    the switch sending a response frame to the terminal in response to the confirmation frame when a pair consisting of the VLAN ID managed by the switch itself and an Internet Protocol Address for the VLAN ID and a pair of the VLAN ID described in the confirmation frame and the Gateway Address sent by the terminal match; and
    the terminal determining whether the VLAN ID described in the confirmation frame is a VLAN ID which it can assign to itself, by receiving response frames sent by the switch in response to confirmation frames.

2. The method of claim 1, wherein, with regards to the sending of a response frame to the terminal in response to the confirmation frame, when it is determined that processing is possible for a matching VLAN ID based on tag information described in the confirmation frame sent by the terminal, a response frame is sent back to the terminal in response to the confirmation frame.

3. The method of claim 2, wherein when a plurality of VLAN IDs are included in the GVRP packet message, the terminal selects an arbitrary VLAN ID from the stored VLAN IDs, makes a confirmation frame, and sends the confirmation frame to the switch, so that when no response frame from the switch is received within a preset time, a VLAN ID other than the selected VLAN ID is selected, a new confirmation frame is made, and the confirmation frame is sent to the server.

4. The method of claim 2, wherein when a plurality of VLAN IDs are included in the GVRP packet message, the terminal makes the same number of confirmation frames as there are stored VLAN IDs, describing individual VLAN IDs for sending to the switch, with a VLAN ID described in a corresponding confirmation frame being described at the response frame from the switch.

5. A method of determining whether a VLAN ID may be assigned to a terminal, said method comprising the steps of:
    a switch sending a GVRP packet message including VLAN IDs that the switch itself manages;
    a terminal monitoring GVRP packet messages sent by the switch so as to store VLAN IDs managed by the switch, and describing the VLAN ID in a request frame for sending to a server;
    the switch sending the request frame sent by the terminal to the server when the VLAN ID described in the request frame sent by the terminal and the VLAN ID to which the server belongs match;
    the server sending a response frame to the terminal in response to the request frame switched by the switch; and
    the terminal determining whether the VLAN ID described in the request frame is a VLAN ID which it can assign to itself, by receiving response frames sent by the server in response to request frames.

6. The method of claim 5, wherein the server sends a response frame to the terminal in response to the request frame switched by the switch, address information preset at the server is included in the response frame for the request frame, and the terminal sets its own address information based on the address information included in the response frame for the request frame.

7. The method of claim 6, wherein when a plurality of VLAN IDs are included in the GVRP packet message, the terminal selects an arbitrary VLAN ID from the stored VLAN IDs, makes a request frame, and sends the request frame to the server so that when no response frame from the server is received within a preset time, a VLAN ID other than the selected VLAN ID is selected, a new request frame is made, and the request frame is sent to the server.

8. The method of claim 6, wherein when a plurality of VLAN IDs are included in the GVRP packet message, the terminal makes the same number of confirmation frames as there are stored VLAN IDs, describing individual VLAN IDs for sending to the server, with a VLAN ID described in a corresponding confirmation frame being described at the response frame from the server.

9. A method of determining whether a VLAN ID may be assigned to a terminal, said method comprising the steps of:
    sending a GVRP packet message via a switch, said GVPR packet message including VLAN IDs that are managed by the switch;
    storing VLAN IDs managed by the switch in a terminal that monitors GVRP packet messages sent by the switch where the terminal sends tag frames describing the VLAN IDs and its own Gateway Address in confirmation frames to the switch;
    sending a response frame to the terminal from the switch in response to a confirmation frame comprising a VLAN ID managed by the switch itself and an Internet Protocol Address for the VLAN ID when the switch determines that the VLAN ID described in the confirmation frame and the Gateway Address sent by the terminal match the VLAN ID managed by the switch and its Internet Protocol Address; and determining whether the VLAN ID described in the confirmation frame is a VLAN ID which the terminal can assign to itself, by receiving response frames sent by the switch in response to the confirmation frame.

10. The method of claim 9, wherein the step of sending of a response frame to the terminal in response to the confirmation frame includes determining if processing is possible for a matching VLAN ID based on tag information described in the confirmation frame sent by the terminal, and if processing is possible, the switch sends a response frame to the terminal.

11. The method of claim 10, wherein when a plurality of VLAN IDs are included in the GVRP packet message, the terminal selects an arbitrary VLAN ID from the stored VLAN IDs to make a new confirmation frame and to send the new confirmation frame to the switch, so that when no response frame from the switch is received within a preset time, a VLAN ID other than the selected VLAN ID is selected so that a new confirmation frame is made, and the new confirmation frame is sent to a server.

12. The method of claim 10, wherein when a plurality of VLAN IDs are included in the GVRP packet message, the terminal makes the same number of confirmation frames as there are stored VLAN IDs, describing individual VLAN IDs for sending to the switch, with a VLAN ID described in a corresponding confirmation frame being described at the response frame from the switch.

13. A method of determining whether a VLAN ID may be assigned to a terminal, said method comprising the steps of:

sending a GVRP packet message including VLAN IDs via a switch, the VLAN IDs being managed by the switch;

monitoring GVRP packet messages sent by the switch in a terminal so as to store VLAN IDs managed by the switch, and describing a VLAN ID in a request frame for sending to a server;

sending the request frame sent by the terminal to the server when the switch determines that the VLAN ID described in the request frame sent by the terminal and the VLAN ID to which the server belongs match;

sending a response frame via the server to the terminal in response to the request frame switched by the switch; and determining at the terminal whether the VLAN ID described in the request frame is a VLAN ID which the terminal can assign to itself, by receiving response frames sent by the server in response to request frames.

14. The method of claim 13, wherein the server sends a response frame to the terminal in response to the request frame switched by the switch, address information preset at the server is included in the response frame for the request frame, and the terminal sets its own address information based on the address information included in the response frame for the request frame.

15. The method of claim 14, wherein when a plurality of VLAN IDs are included in the GVRP packet message, the terminal selects an arbitrary VLAN ID from the stored VLAN IDs to make a new request frame and to send the new request frame to the server so that when no response frame from the server is received within a preset time, a VLAN ID other than the selected VLAN ID is selected, a new request frame is made, and the new request frame is sent to the server.

16. The method of claim 14, wherein when a plurality of VLAN IDs are included in the GVRP packet message, the terminal makes the same number of confirmation frames as there are stored VLAN IDs, describing individual VLAN IDs for sending to the server, with a VLAN ID described in a corresponding confirmation frame being described at the response frame from the server.

* * * * *